(No Model.) 2 Sheets—Sheet 1.
W. T. FERGUSON.
CONVEYER.
No. 546,315. Patented Sept. 17, 1895.
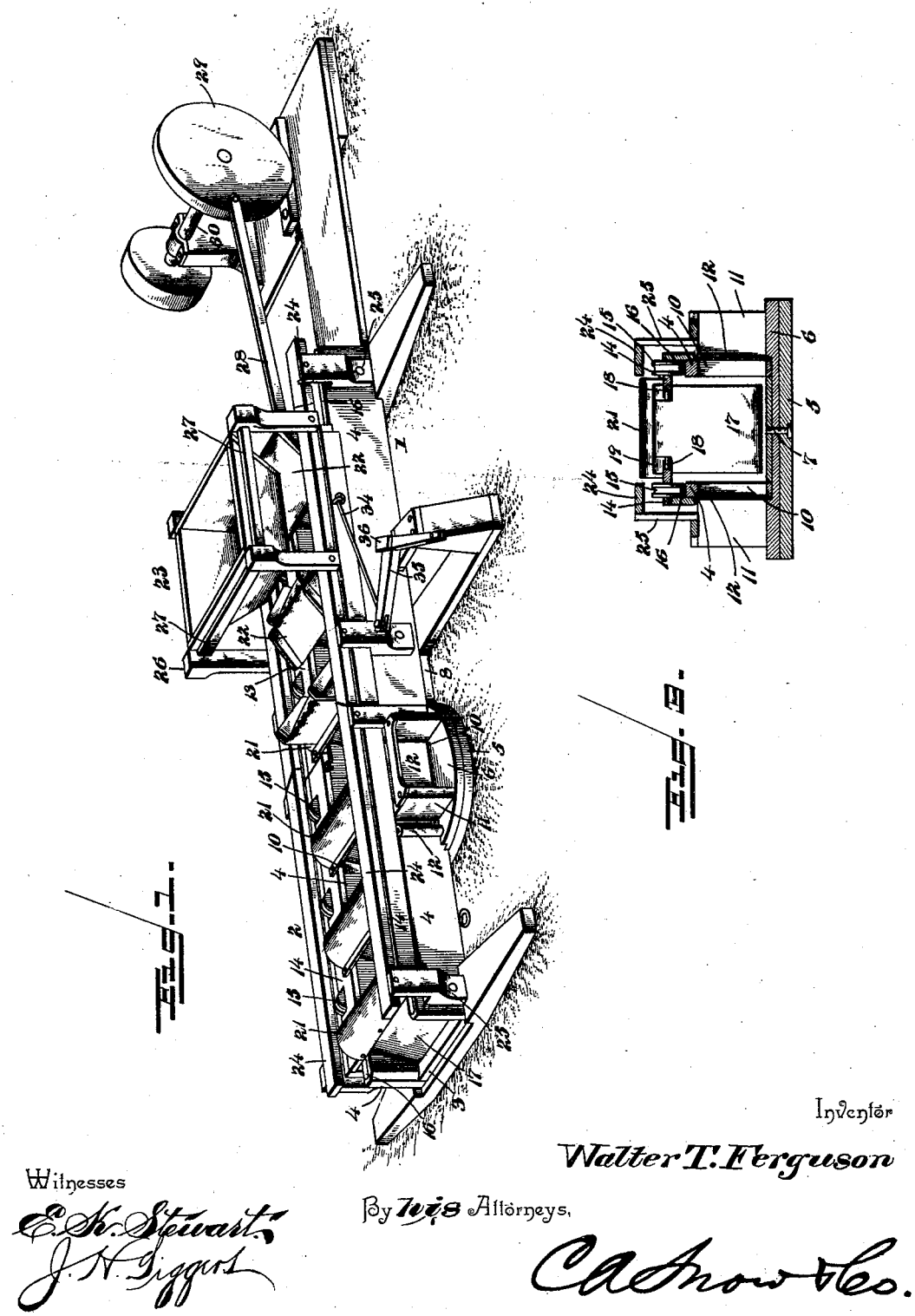
Witnesses
E. K. Stewart
J. H. Siggers
Inventor
Walter T. Ferguson
By his Attorneys,
C. A. Snow & Co.

(No Model.) 2 Sheets—Sheet 2.
W. T. FERGUSON.
CONVEYER.
No. 546,315. Patented Sept. 17, 1895.
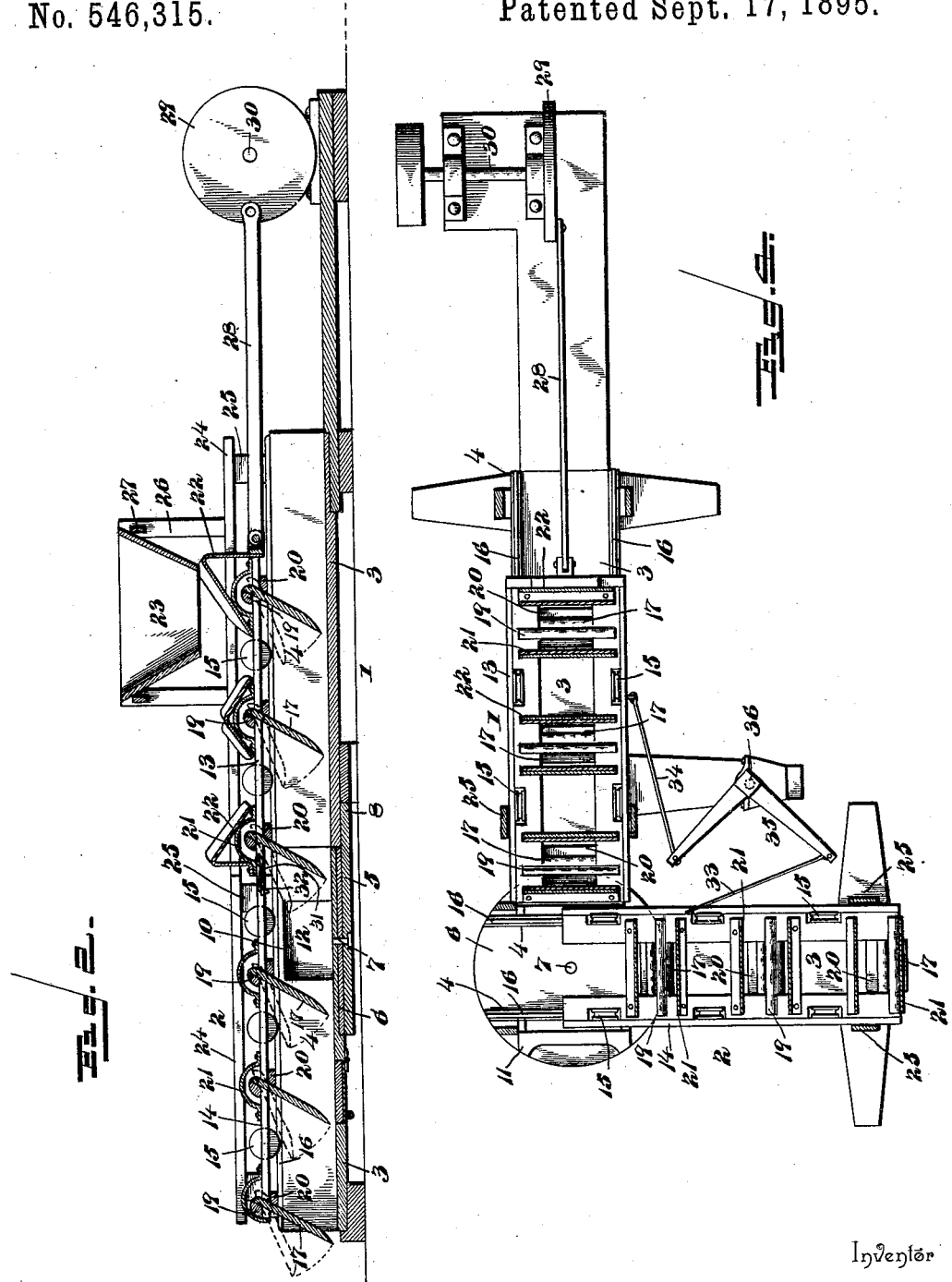
Witnesses
E. K. Stewart
J. H. Siggers
Inventor
Walter T. Ferguson
By his Attorneys,
C. A. Snow & Co.

UNITED STATES PATENT OFFICE.

WALTER T. FERGUSON, OF FUGATE'S HILL, VIRGINIA.

CONVEYER.

SPECIFICATION forming part of Letters Patent No. 546,315, dated September 17, 1895.

Application filed October 13, 1894. Serial No. 525,831. (No model.)

*To all whom it may concern:*

Be it known that I, WALTER T. FERGUSON, a citizen of the United States, residing at Fugate's Hill, in the county of Russell and State of Virginia, have invented a new and useful Conveyer, of which the following is a specification.

The invention relates to improvements in conveyers.

The object of the present invention is to provide a simple and inexpensive conveyer adapted for shoveling grain, sawdust, earth, and the like and capable of being readily adjusted to deliver the material in the desired direction either in a straight line or to the right or left.

The invention consists in the construction and novel combination and arrangement of parts, hereinafter fully described, illustrated in the accompanying drawings, and pointed out in the claims hereto appended.

In the drawings, Figure 1 is a perspective view of a conveyer constructed in accordance with this invention. Fig. 2 is a central longitudinal sectional view of the same. Fig. 3 is a transverse sectional view. Fig. 4 is a horizontal sectional view, the sections being arranged at right angles.

Like numerals of reference indicate like parts in all the figures of the drawings.

1 designates a main trough-section, preferably rectangular in cross-section and having pivotally connected to one end of it a horizontally-adjustable auxiliary or extension section 2, adapted to be arranged in alignment with the main section or to be disposed at right angles thereto, as illustrated in Fig. 4 of the accompanying drawings. Each section is composed of a horizontal bottom 3 and vertical sides 4, and the pivotal connection or coupling consists of a lower circular bed-plate or disk 5 and an upper circular turn-table or disk 6, connected with the lower one by a central pivot 7. The lower disk or bed-plate is provided with a forward extension 8, which is secured to the main trough-section, and the upper disk or turn-table is suitably secured to the auxiliary or extension section 2 of the trough, and the bottoms of the sections of the trough are arranged in the same horizontal plane and are flush with the upper face of the turn-table or upper disk 6, whereby the material may pass readily through the trough without obstruction. The front end of the extension or auxiliary section is provided at opposite sides with rectangular openings 10 and have laterally-disposed box-like extensions 11, either of which is adapted to register with the rear end of the main trough-section when the trough-section 2 is turned at right angles to the main section. The openings at the sides of the section 2 of the trough are covered when the sections are arranged in alignment by sliding doors 12, located in suitable ways of the section 2, and the front end of the latter may be closed by any suitable means when the sections are arranged at right angles.

The trough may consist of any desired number of sections, according to the distance it is necessary to convey the material, and the sections 1 and 2 have slidingly mounted on them reciprocating carriage-frames 13 and 14, each consisting of side-bars or beams connected by cross-pieces and having journaled on them grooved rollers 15. The grooved rollers are preferably arranged in openings of the sides of the carriage-frame and are mounted on longitudinal tracks 16, secured to the upper edges of the sides of the trough. Each section of the trough receives and has operating in it depending swinging shovels 17, pivoted or journaled between the sides of the reciprocating carriages 13 and 14 on horizontal pintles 18 and arranged between upper and lower cross-bars 19 and 20. The upper cross-bars are secured to the top of the carriage and are located in rear of the shovels, and the lower cross-bars 20 are secured to the lower faces of the side bars or beams of the carriage and are arranged in advance of the shovels, whereby in the rearward movement of the carriage the shovels, by having their forward swing limited by the cross-bars 19 and 20, will be held in a slightly-inclined position for conveying the material, as illustrated in Fig. 2 of the accompanying drawings, and will be allowed to swing upward, as illustrated in dotted lines in Fig. 2, in order that the shovels may pass over the material without disturbing it.

When the carriages move forward to bring the shovels in position for operating on the material, the shovels coming in contact with the material are swung upward by the same, and in this manner pass freely over the material.

The shovels are protected by shields 21 and 22, disposed transversely of the carriage-frame and arched over and covering the cross-bars 19 and 20 to prevent any of the substance operated on from getting between the cross-bars and clogging the shovels and interfering with their operation. The shields 21, which are located over the carriage of the auxiliary or extension section, are preferably curved or semicylindrical, as shown, while those of the other carriage-frame have inclined sides to direct the material dropping from a hopper 23 into the trough.

The carriage-frames are held against upward movement by guard-rails 24, located at each side of the trough above the grooved rollers and supported by vertical standards 25, having laterally-offset upper portions to clear the carriage-frames.

The hopper has tapering sides and is open at its bottom and is supported by legs 26, secured to the adjacent guard-rails and connected by upper horizontal bars 27, which are also secured to the hopper. The material to be conveyed is deposited into the hopper and is delivered by the latter to the main chute, after which it is operated on by the shovels, as before described.

The carriage-frame of the main trough-section is connected in any suitable manner by a pitman 28 with a crank-wheel 29 of a drive-shaft 30, whereby the carriage-frames are reciprocated; but any other suitable gearing may be employed for imparting a reciprocating motion to the carriage-frames.

When the carriage-frames are arranged in alignment, they are detachably connected by hooks 31 and eyes 32; but when located at right angles they are connected by rods 33 and 34 with a horizontally-disposed oscillating bell-crank lever 35, which is fulcrumed at its angle on a post or standard 36, located a short distance to one side of the main section of the trough.

The rear end of the bottom of the main section of the trough is concavely cut out, corresponding with the outline of the turn-table, as indicated in dotted lines in Fig. 4, and fits snugly against the periphery of the turn-table or upper disk 6, and the lateral extensions of the section 2 of the trough terminate at the periphery of the turn-table in order to register snugly with the adjacent ends of the sides of the main section of the trough.

The distance between the inclined shovels depends on the stroke of the crank, and they should be separated a distance a little less than the length of the reciprocation of the carriage. This will carry the inclined shovel entirely in rear of the bulks or accumulations of material, and the shovels are allowed to swing down in their proper position in clear spaces prepared by the shovels in the rear. The incline of the shovels, as shown, causes the weight of the material to be supported principally by the rollers, which prevent any friction.

It will be seen that the conveyer is simple and comparatively inexpensive in construction, that it is adapted for operating effectively on grain, sawdust, earth, and similar substances, and that the sections of the trough may be readily adjusted to direct the material to the right or to the left or in a straight line.

Changes in the form, proportion, and the minor details of construction may be resorted to without departing from the principle or sacrificing any of the advantages of this invention, such as varying the number of shovels, their inclination, and the distance they are apart.

Having described the invention, I claim—

1. The combination of a trough, a reciprocating carriage-frame mounted on the trough, shovels hingedly mounted on the carriage-frame and depending therefrom, and the upper and lower cross-bars arranged in pairs at each shovel, the upper one being located in rear of the shovel and the lower one in advance of the same, whereby the shovels are supported, and their forward swing limited, substantially as and for the purpose described.

2. In a conveyer, the combination of a trough, a reciprocating carriage-frame, swinging shovels depending from the carriage-frame, upper and lower cross-bars secured to the frame and located in rear and in advance of the shovels to support and limit the forward swing of the latter, and transversely-disposed shields rigidly mounted on the carriage frame and arched over the tops of the shovels and the cross-bars, substantially as described.

3. In a conveyer, the combination of a trough, a reciprocating carriage-frame, swinging shovels depending from the carriage-frame, means for limiting the forward swing of the shovels, a rigidly mounted hopper located directly above the trough, and shields disposed transversely of the carriage-frame and rigidly mounted thereon and having inclined sides to direct the material into the trough, substantially as described.

4. In a conveyer, the combination of a trough, a reciprocating carriage-frame provided with rollers, tracks arranged on the sides of the trough and receiving the rollers, guard-rails located above the rollers and arranged to be engaged by the same to prevent upward movement of the carriage-frame while carrying the material, and shovels depending from the carriage-frame, substantially as described.

5. In a conveyer, the combination of a trough composed of two sections, one of the sections being pivotally connected with the other and capable of swinging horizontally and of being arranged at right angles to change the direction of the conveyer and provided at opposite sides with openings adapted to register with the adjacent end of the other section, and shovels, substantially as described.

6. In a conveyer, a trough composed of two sections pivotally connected, one of the sections being arranged to swing at right angles to the other section to change the direction of the conveyer and having openings at opposite sides and provided with lateral extensions adapted to register with the adjacent end of the other section, combined with doors for normally closing said openings, substantially as described.

7. In a conveyer, the combination of a main trough section provided with a bed-plate, an extension section provided at opposite sides with openings and having lateral extensions, a turn-table mounted on the bed-plate and supporting the adjacent end of the extension section, and doors for normally closing said openings, substantially as described.

8. In a conveyer, the combination of a main section, an extension section pivotally connected with the main section and capable of swinging at right angles thereto, reciprocating carriage-frames mounted on the sections and provided with shovels, a horizontally-disposed oscillating bell-crank lever fulcrumed at its angle, and connecting-rods extending between the arms of the bell-crank lever and the carriage-frames, substantially as described.

In testimony that I claim the foregoing as my own I have hereto affixed my signature in the presence of two witnesses.

WALTER T. FERGUSON.

Witnesses:
W. R. AKERS,
A. J. BIGGS.